United States Patent

Bortz et al.

[11] Patent Number: 5,165,902
[45] Date of Patent: Nov. 24, 1992

[54] METHOD AND APPARATUS FOR REDUCING NITROGEN DIOXIDE EMISSIONS IN A DRY SODIUM SCRUBBING PROCESS USING HUMIDIFICATION

[75] Inventors: Steven J. Bortz, Laguna Niguel; John W. Podlenski, Orange, both of Calif.

[73] Assignee: Research Cottrell, Inc., Branchburg, N.J.

[21] Appl. No.: 738,620

[22] Filed: Jul. 31, 1991

[51] Int. Cl.⁵ ............................................. C01B 21/00
[52] U.S. Cl. ....................... 423/235; 423/239; 423/244.08
[58] Field of Search ............... 423/235, 239, 244 A

[56] References Cited

U.S. PATENT DOCUMENTS

| | | | |
|---|---|---|---|
| 1,329,737 | 2/1920 | Wolcott . | |
| 1,329,818 | 2/1920 | Wolcott . | |
| 3,523,407 | 8/1970 | Humbert . | |
| 3,944,650 | 3/1976 | Hirota et al. | 423/242 |
| 3,976,747 | 8/1976 | Shale et al. | 423/244 |
| 4,325,713 | 4/1982 | Rosenberg et al. | 55/73 |
| 4,525,142 | 6/1985 | Gleason et al. | 423/235 |
| 4,559,211 | 12/1985 | Feldmann et al. | 423/242 |
| 4,600,568 | 7/1986 | Yoon et al. | 423/242 |
| 4,604,269 | 8/1986 | Yoon | 423/242 |
| 4,613,487 | 9/1986 | Yoon et al. | 423/244 |
| 4,620,856 | 11/1986 | Rosenberg et al. | 55/73 |
| 4,645,652 | 2/1987 | Kimura | 423/235 |
| 4,645,653 | 2/1987 | Kimura | 423/235 |
| 4,670,238 | 6/1987 | Yoon | 423/244 |
| 4,724,130 | 2/1988 | Statnick et al. | 423/208 |
| 4,789,531 | 12/1988 | Eichholtz et al. | 423/235 |
| 4,795,619 | 1/1989 | Lerner | 423/244 |
| 4,859,438 | 8/1989 | Lindbauer et al. | 423/239 |
| 4,865,828 | 9/1989 | Lerner | 423/244 |
| 5,002,741 | 3/1991 | Hooper | 423/239 |

OTHER PUBLICATIONS

Proof of Concept Testing Of An Integrated Dry Injection System For $SO_x/NO_x$ Control, Quarterly Technical Progress Report, NTIS, May 3, 1989.
Integrated Dry Sorbent Injection For Coal-Fired Boiler $SO_x$ and $NO_x$ Control, AWMA, Jun. 24-29, 1990.

Primary Examiner—Gary P. Straub
Assistant Examiner—Timothy C. Vanoy

[57] ABSTRACT

A method and apparatus for reducing nitrogen dioxide ($NO_2$) emissions in a dry sodium scrubbing process without significantly reducing sulfur dioxide ($SO_2$) and nitrogen oxides ($NO_x$) removal efficiencies. A sodium additive is injected into a flue gas duct carrying flue gas from a combustor to a particulate collection device to remove sulfur dioxide and nitrogen oxides from the flue gas. The flue gas is humidified by introducing water into the flue gas duct at a point upstream of the sodium additive introduction point. Through control of the moisture content of the flue gas and the temperature in the particulate collection device, the amount of $NO_2$ emissions is reduced to a value below that which causes the creation of a brown plume emanating from the gas stack.

17 Claims, 10 Drawing Sheets

METHOD AND APPARATUS FOR REDUCING NITROGEN DIOXIDE EMISSIONS IN A DRY SODIUM SCRUBBING PROCESS USING HUMIDIFICATION

BACKGROUND OF THE INVENTION

The invention relates generally to flue gas desulfurization and, more particularly, to a method of reducing nitrogen dioxide ($NO_2$) emissions from a flue gas duct using a dry sodium scrubbing process without significantly reducing sulfur dioxide ($SO_2$) and nitrogen oxides ($NO_x$) removal efficiencies.

To control acid rain the major air pollutants that must be removed from a flue gas effluent produced when burning fossil fuel are sulfur dioxide ($SO_2$) and nitrogen oxides ($NO_x$). In air pollution terminology, $NO_x$ refers to two gaseous oxides of nitrogen, namely, nitrogen dioxide ($NO_2$) and nitric oxide (NO). In the past, dry sodium scrubbing has been one of the methods employed to remove $SO_2$ and $NO_x$. In this type of process, a dry sodium compound, such as sodium bicarbonate ($NaHCO_3$) or sodium sesquicarbonate ($Na_2CO_3NaHCO_3 2H_2O$), is injected into the flue gas duct that carries flue gas from the combustion chamber of a boiler or the like to the flue gas stack for venting the effluent to atmosphere. Though the sodium injection is generally effective in removing sulfur dioxide ($SO_2$) and nitrogen oxides ($NO_x$), during this process a portion of the nitric oxide (NO) is converted to nitrogen dioxide ($NO_2$), which usually results in a plume emanating from the gas stack having an undesirable brown color. The chemistry of $NO_x$ removal by, for example, sodium bicarbonate is given below.

$2NaHCO_3 \rightarrow Na_2CO_3 + CO_2 + H_2O$  1

$Na_2CO_3 + SO_2 + NO + O_2 \rightarrow Na_2SO_4 + NO_2 + CO_2$  2

$Na_2CO_3 + 3NO_2 \rightarrow 2NaNO_3 + NO + CO_2$  3

Because the production of $NO_2$ in reaction 2 outpaces its removal via reaction 3, the result is a net generation of $NO_2$ with sodium bicarbonate injection.

Various additives have been used to try to eliminate the brown plume, and some success in controlling nitrogen dioxide emissions has been achieved using ammonia ($NH_3$) and urea. However, use of these additives can create new air and waste disposal problems, including high $NH_3$ slip and the presence of soluble $NH_3$ compounds in the fly ash.

Hence, the invention is directed to providing a dry sodium scrubbing process that reduces nitrogen dioxide emissions to a level below that which causes the creation of a brown plume, without significantly reducing sulfur dioxide and nitrogen oxides removal efficiencies while, at the same time, avoiding the above-mentioned drawbacks and disadvantages.

SUMMARY OF THE INVENTION

The invention solves this problem by providing a dry sodium scrubbing process in which $NO_2$ emissions are reduced without significantly reducing $SO_2$ and $NO_x$ removal efficiencies by humidifying and cooling the flue gas. More specifically, a sodium additive is injected into a flue gas duct carrying flue gas from a fossil fuel burning combustor to a particulate collection device to remove sulfur dioxide and nitrogen oxides from the flue gas and the flue gas is humidified by introducing water into the flue gas duct at a point upstream of the particulate collection device.

The step of humidifying the flue gas increases the moisture content of the flue gas to a value that produces an $NO_2$ concentration downstream of the particulate collection device below the level at which a brown plume becomes visible upon venting the flue gas to atmosphere. A general rule that can be used to determine the brown plume threshold is to reduce the $NO_2$ emissions in ppm to a value that is less than 200 divided by the gas stack diameter in feet.

The sodium additive is injected into the flue gas duct at a point upstream of the particulate collection device. The flue gas is humidified by introducing water into the duct, most preferably, at a point disposed upstream of the sodium additive injection point. In some cases, it may be desirable to introduce water downstream of the sodium additive injection point and upstream of the particulate collection device.

The sodium additive may be sodium bicarbonate, sodium sesquicarbonate, or a mixture thereof. A further step of injecting a sulfur adsorbing sorbent into the convention bank of the combustor may be optionally employed. An apparatus for reducing nitrogen dioxide ($NO_2$) emissions without significantly reducing $SO_2$ and $NO_x$ removal efficiencies in accordance with the invention is also disclosed.

Tests were conducted in accordance with the principles of the invention and excellent results were obtained when the flue gas was humidified to increase the moisture content of the flue gas to a value in the range of 10–20% $H_2O$, the sodium additive was injected at a temperature of approximately 240° F.–350° F., and the temperature of the flue gas in the particulate collection device was approximately 180° F.–280° F. However, the preferred value for the sodium additive injection temperature is approximately 250° F., while the preferred moisture content is approximately 15% $H_2O$ and the preferred temperature of the flue gas in the particulate collection device is approximately 190° F.

DETAILED DESCRIPTION

Figure 1:
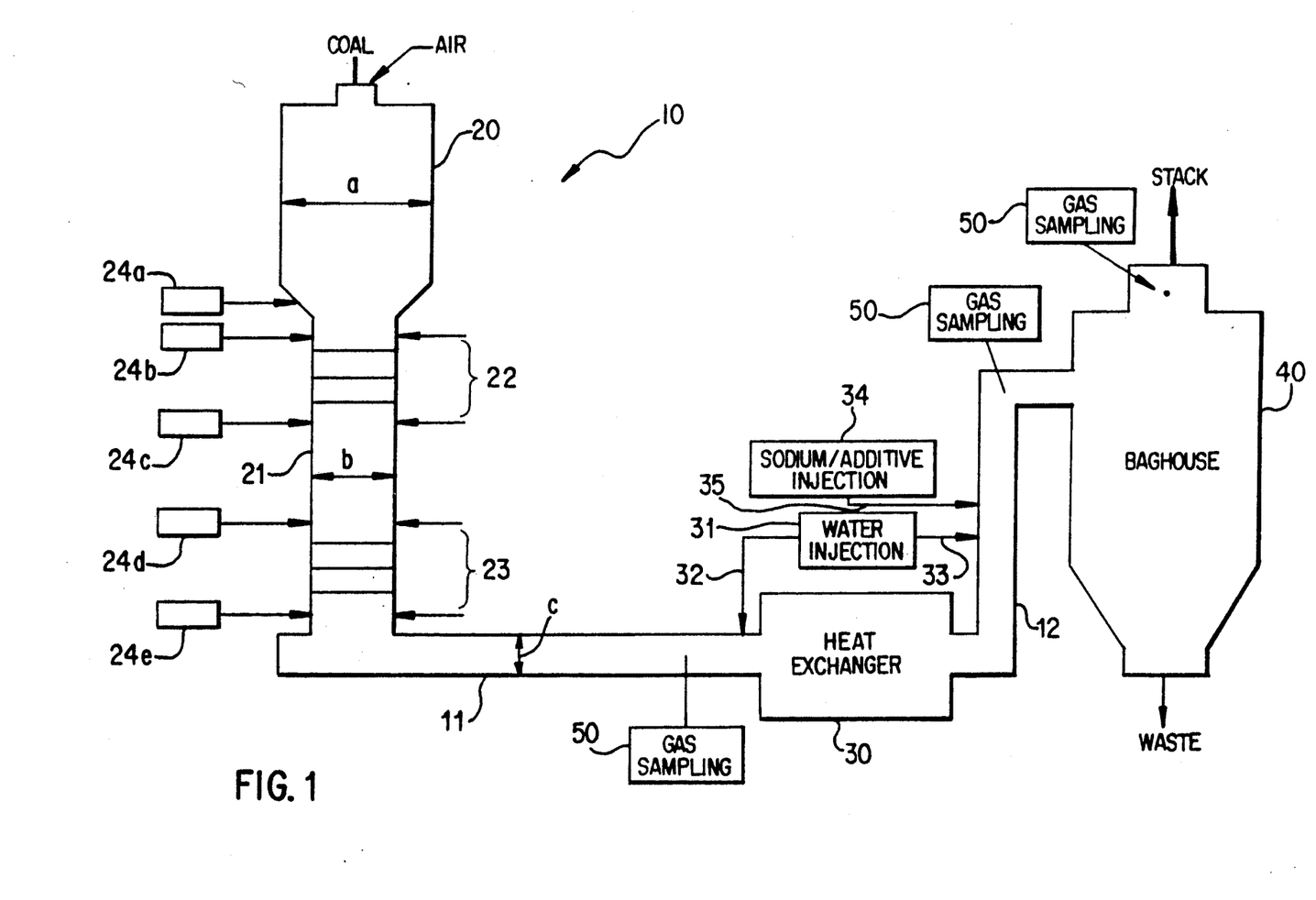
FIG. 1 is a flow diagram that schematically illustrates the flue gas desulfurization system of the present invention.

FIG. 1 schematically illustrates in process flow diagram form a fossil fuel-burning facility 10 equipped with flue gas desulfurization apparatus constructed according to the principles of the invention. The furnace or combustor 20 of the facility is fed with a pulverized solid fuel, such as coal in the case of the illustrated coal fuel-fired boiler, and with air to burn the fuel and generate heat in a manner known in the art. From the combustor 20, the gases produced during this process are conducted to a convection section 21 of the boiler where they pass through convective banks 22 and 23 for heat extraction. The first portion 11 of a flue gas duct is connected to the outlet of convection section 21 for conducting the flue gases to a gas stack for venting. A heat exchanger 30 is arranged between the first flue gas duct section 11 and a second flue gas duct section 12 for reducing the temperature of the flue gas to a value, typically 350° F. or less, which is the safe operating temperature of the baghouse. In a utility furnace, this temperature is achieved by use of an air preheater. The outlet of duct section 12 is connected to a baghouse 40. Baghouse 40 contains fabric filters for separating particles made during the combustion process, such as fly ash, from the flue gas before it is conducted to the gas stack for venting. The filtered particles themselves may be recycled or otherwise disposed of as schematically illustrated in FIG. 1. Of course, other types of particulate collection devices, such as electrostatic precipitators or the like, may be used for solids removal.

Apparatus for injecting a sodium additive, such as sodium bicarbonate, sodium sesquicarbonate, or a mixture thereof, is schematically illustrated at 34. Sodium injection apparatus 34 introduces the sodium additive into flue gas duct section 12 via a line 35, which is disposed at a position upstream of the baghouse inlet and downstream of the heat exchanger outlet. Any type of injection apparatus known in the art may be used to introduce the sodium additive into the gas duct. For example, injection can be accomplished directly by a compressed air-driven eductor.

Water injection apparatus schematically illustrated at 31 humidifies and cools the flue gas by injecting water into flue gas duct section 12 via a line 33, which is disposed at a position upstream of the baghouse inlet and, preferably, upstream of the sodium additive injection point as well. Optionally, depending upon the degree of humidification desired, the water injection apparatus 31 may conduct some or all of the water to be injected via suitable valving to a line 32, which is connected to duct section 11 at a position upstream of the heat exchanger inlet. In either event, the water injection apparatus includes appropriate valves, spray nozzles, and the like for conducting the water into the flue gas duct.

A sorbent, such as limestone, may be optionally injected via one or more sorbent injection apparatuses 24a-24e directly into the convection section 21 of the boiler to adsorb sulfur dioxide. In general, the efficiency of the sorbent injection at this point decreases when low $SO_2$ concentrations are reached. Thus, especially when high $SO_2$ removal efficiencies are desired, this sorbent injection would not obviate the sodium additive step carried out by injection apparatus 34.

Gas analysis apparatus 50 may be provided throughout the system, as illustrated at points upstream and downstream of the heat exchanger and in the gas outlet section of the baghouse. Additionally, if one or more of the sorbent injection apparatuses 24 are not provided, gas sampling apparatuses may be provided at these points as well.

The invention will now be illustrated by the examples shown on the following tables, which contain test data collected from a pilot plant facility constructed according to the principles of the invention. The pilot scale facility was generally configured as illustrated in FIG. 1 and used coal as fuel, which was burned in the combustor at a rate of $0.25 \times 10^6$ Btu/h. No sorbent was injected into the boiler during any of these tests. The width a of the combustor 20 was 18 inches and the width b of the convection section 21 was 6 inches, as was the width c of the duct 11. The temperature of the flue gas at the locations of sorbent injection/gas analysis apparatuses 24a-24e was approximately 1200° F., 1100° F., 1000° F., 900° F. and 800° F., respectively. The heat exchanger 30 cooled the flue gas to a temperature of 350° F. at the outlet of the heat exchanger.

During the tests discussed below, the characteristics of the flue gases were measured at the three positions shown at 50 in FIG. 1, i.e., at the outlet of the convective section 21, at the baghouse inlet, and the baghouse outlet. The amounts of $SO_2$ and $NO_x$ measured were based on the respective differences between the $SO_2$, NO, $NO_2$ and $NO_x$ levels at the convective section outlet without any injection and those levels measured at the baghouse outlet after sodium injection. All measurements shown in the data tables were normalized to 3% $O_2$. Actual $O_2$ values were approximately 4% at the convective section outlet, 4% at the baghouse inlet and 8% at the baghouse outlet.

The flue gas flow from the furnace was approximately 4.2 pound/min. and the residence time between the sodium injection point and the baghouse inlet was about 1.0 seconds during which time the temperature remained steady. The average temperature inside the baghouse was measured by inserting a thermocouple through the wall of the baghouse between bags and should have accurately represented the temperature of the sodium additive deposited on the bags. The gas residence times and cooling rates were comparable to those expected for full-scale boilers.

The sodium compounds injected were sodium bicarbonate, $NaHCO_3$ and sodium sesquicarbonate, $Na_2CO_3 \cdot NaHCO_3 \cdot 2H_2O$. The mass mean diameter particle sizes were 12.9 microns for the bicarbonate and 12.2 microns for the sesquicarbonate. For all tests, the initial $SO_2$ concentration was 2600 ppm, the initial NO concentration was 350 ppm, and the initial moisture content was 7–8% $H_2O$. The baghouse temperature was lower than the sodium injection temperature, due to heat loss through the walls and air leakage. The injected sodium compounds were entrained in flue gas at the injection temperature for about one second, after which they entered the baghouse, where they remained until removed from the bags. The reactions between the sodium compounds and $SO_2$ and $NO_x$ therefore took place initially at the injection temperature (one second) and subsequently at the baghouse temperature (minutes).

Table 1 below shows the results of sodium additive tests conducted with sodium bicarbonate as the additive both with and without humidification. The $NO_x$ removals and $NO_2$ emissions have been normalized by the change in $SO_2$ concentration because the $NO_x$ removal and $NO_2$ formation appear to be driven by the reaction of $SO_2$ with the sodium additive. This method of normalizing the data allows for easy estimation of $NO_x$ reductions and $NO_2$ emissions for a given $SO_2$ reduction.

As shown below, Table 1 sets out for each test, the $Na_2/S$ ratio, which is the amount of sodium in the additive Compared to the amount of sulfur in the flue gas, as well as amounts of sulfur dioxide removed in ppm, the percentage of $Na_2$ utilized, the amount of nitric oxide (NO) removed in ppm, the amount of nitrogen dioxide ($NO_2$) generated in ppm, and the amount of nitrogen oxides ($NO_x$) removed in ppm. All of these values were measured in the manner discussed above. In addition, the normalized ratios of the respective changes in nitric oxide (NO), nitrogen oxides ($NO_x$), and nitrogen dioxide ($NO_2$) relative to the change in sulfur dioxide ($SO_2$) are set out. Na Inj. temp. refers to the injection temperature in degrees Fahrenheit of the sodium additive, which also is the temperature of the flue gas at the baghouse inlet. The average temperature at the center of the baghouse is set forth in the last column.

$NO_x$ removals and $NO_2$ emissions from the data obtained from Table 1. The vertical axis is labelled $|\Delta|$ ppm, which is the absolute value of the amount of the particular gas species present before the sodium additive injection minus the amount present after injection, in parts per million. In the case of $SO_2$ and $NO_x$, this is the amount of particulate matter removed while in the case of $NO_2$, this is the amount of $NO_2$ emissions generated. The average temperature in the baghouse is plotted on the lower horizontal axis. The upper horizontal axis roughly indicates the relationship between temperature and the moisture content of the flue gas as the gas leaving the heat exchanger 30 at approximately 350° F. is cooled by the humidification step. Baghouse temperatures above about 250.F are considered to result in non-humidified flue gas while those below about 200° F. are considered humidified. The graph of FIG. 2 also illustrates that $NO_x$ efficiency is fairly constant regardless of humidification and that the humidification step actually improved the $SO_2$ removal efficiency at baghouse temperatures below 250° F.

Figure 3:
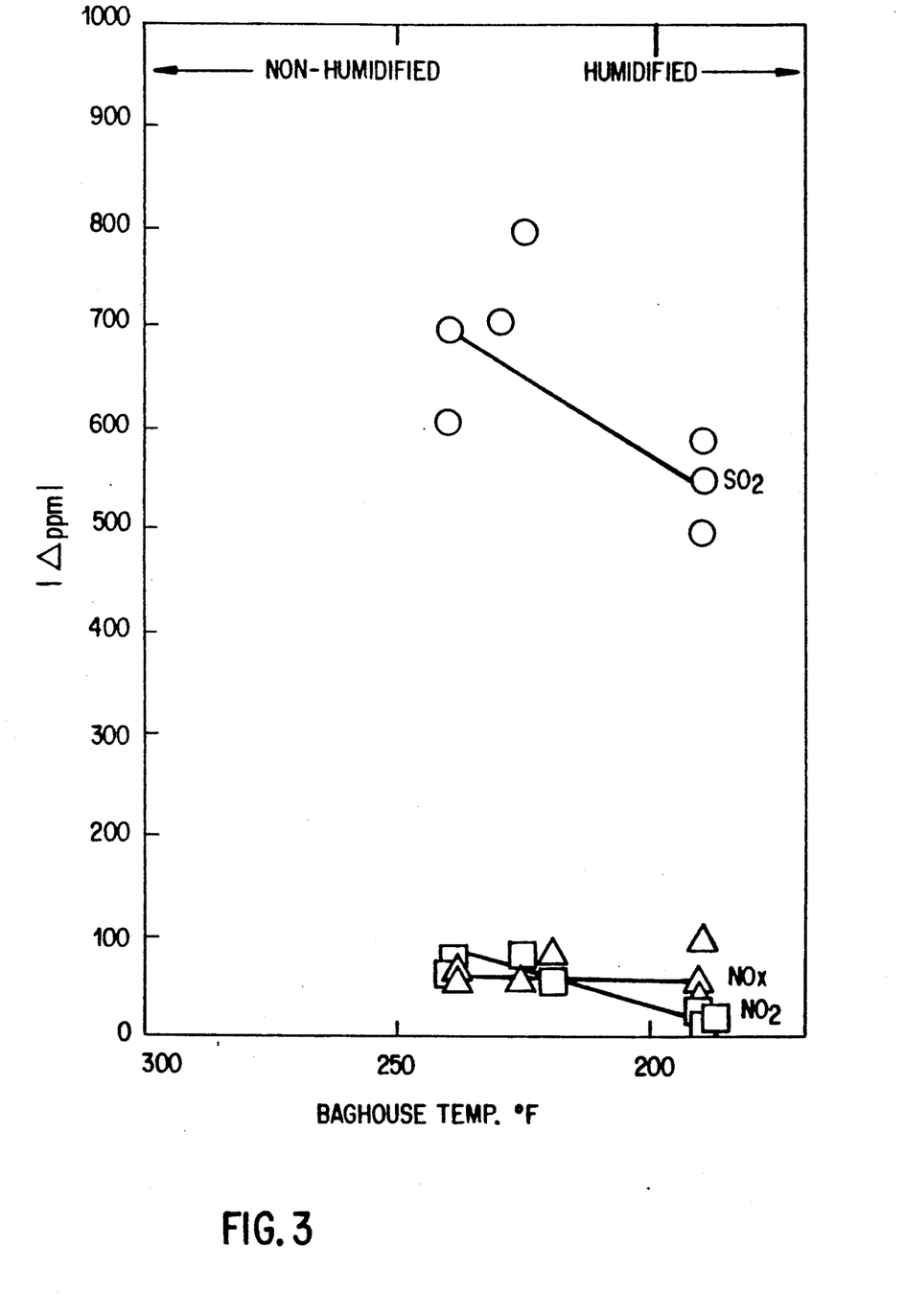
FIG. 3 is a graph that illustrates the effect of humidification prior to sodium sesquicarbonate injection on $SO_2$ and $NO_x$ removals and $NO_2$ emissions in accordance with the principles of the invention.

Table 2 below and FIG. 3 illustrate the results of similar tests conducted using sodium sesquicarbonate as the sodium additive. In these tests, humidification decreased $NO_2$ emissions from values ranging between 54–84 ppm to 14–17 ppm, while $NO_x$ removal efficiency remained approximately constant, and $SO_2$ removal efficiency decreased somewhat.

TABLE 2

NORMALIZED $NO_x$ REMOVALS AND $NO_2$ INCREASE DURING $NO_2$ ADDITIVE TESTS WITH SESQUICARBONATE

| Test No. | $Na_2/S$ Ratio | $\Delta SO_2$ ppm | $Na_2$ Ut. % | Decrease $\Delta NO$ ppm | Increase $\Delta NO_2$ ppm | Decrease $\Delta NO_x$ ppm | $\Delta NO/ \Delta SO_2$ | $\Delta NO_x/ \Delta SO_2$ | $\Delta NO_2/ \Delta SO_2$ | Na Inj. Temp. °F. | Baghouse Temp. °F. |
|---|---|---|---|---|---|---|---|---|---|---|---|
| 1 | 1.0 | 794 | 80.0 | 143 | 74 | 69 | 0.18 | 0.08 | 0.09 | 320 | 225 |
| 2 | 1.2 | 608 | 74.9 | 141 | 84 | 57 | 0.23 | 0.09 | 0.14 | 350 | 240 |
| 3* | 1.0 | 547 | 60.0 | 111 | 14 | 97 | 0.20 | 0.18 | 0.02 | 250 | 190 |
| 6 | 1.2 | 707 | 65.5 | 132 | 54 | 78 | 0.19 | 0.11 | 0.08 | 340 | 230 |
| 10 | 1.0 | 699 | 70.6 | 134 | 62 | 72 | 0.19 | 0.10 | 0.09 | 350 | 240 |
| 11* | 1.0 | 588 | 61.0 | 69 | 17 | 52 | 0.12 | 0.09 | 0.03 | 270 | 190 |
| 12* | 1.0 | 500 | 58.5 | 60 | 15 | 46 | 0.12 | 0.09 | 0.03 | 270 | 190 |

*Humidification used.

From these two series of initial tests, the most optimal

TABLE 1

NORMALIZED $NO_x$ REMOVALS AND $NO_2$ INCREASE DURING $NO_2$ ADDITIVE TESTS WITH BICARBONATE

| Test No. | $Na_2/S$ Ratio | Decrease $\Delta SO_2$ ppm | $Na_2$ Ut. % | Decrease $\Delta NO$ ppm | Increase $\Delta NO_2$ ppm | $\Delta NO_x$ ppm | $\Delta NO/ \Delta SO_2$ | $\Delta NO_x/ \Delta SO_2$ | $\Delta NO_2/ \Delta SO_2$ | Na Inj. Temp. °F. | Baghouse Temp. °F. |
|---|---|---|---|---|---|---|---|---|---|---|---|
| B1-2 | 1.5 | 461 | 40.9 | 103 | 41 | 62 | 0.22 | 0.134 | 0.09 | 350 | 236 |
| B-4 | 1.6 | 533 | 48.4 | 110 | 43 | 67 | 0.21 | 0.126 | 0.08 | 350 | 234 |
| B-14* | 1.4 | 773 | 68.2 | 82 | 18 | 64 | 0.11 | 0.08 | 0.02 | 250 | 190 |
| B-15 | 1.5 | 752 | 62.9 | 111 | 58 | 54 | 0.15 | 0.07 | 0.08 | 450 | 290 |
| B-9* | 1.2 | 858 | 69.9 | 96 | 13 | 83 | 0.11 | 0.10 | 0.02 | 240 | 190 |

*Humidification used.

The test results from Table 1 clearly show that humidifying the flue gas stream prior to sodium injection significantly reduces the amount of NO converted to $NO_2$. Comparison of the $NO_2$ emissions in Test Nos. B1-2, B-4, and B-15 with the $NO_2$ emissions in Tests Nos. B-14 and B-9 shows a decrease in $NO_2$ emissions to values of 18 and 13 ppm, respectively, from values of 41, 43 and 58, respectively. The amount of $NO_2$ remaining after the humidification was less than 20 parts per million, which generally is below the $NO_2$ level at which a brown plume is created.

Figure 2:
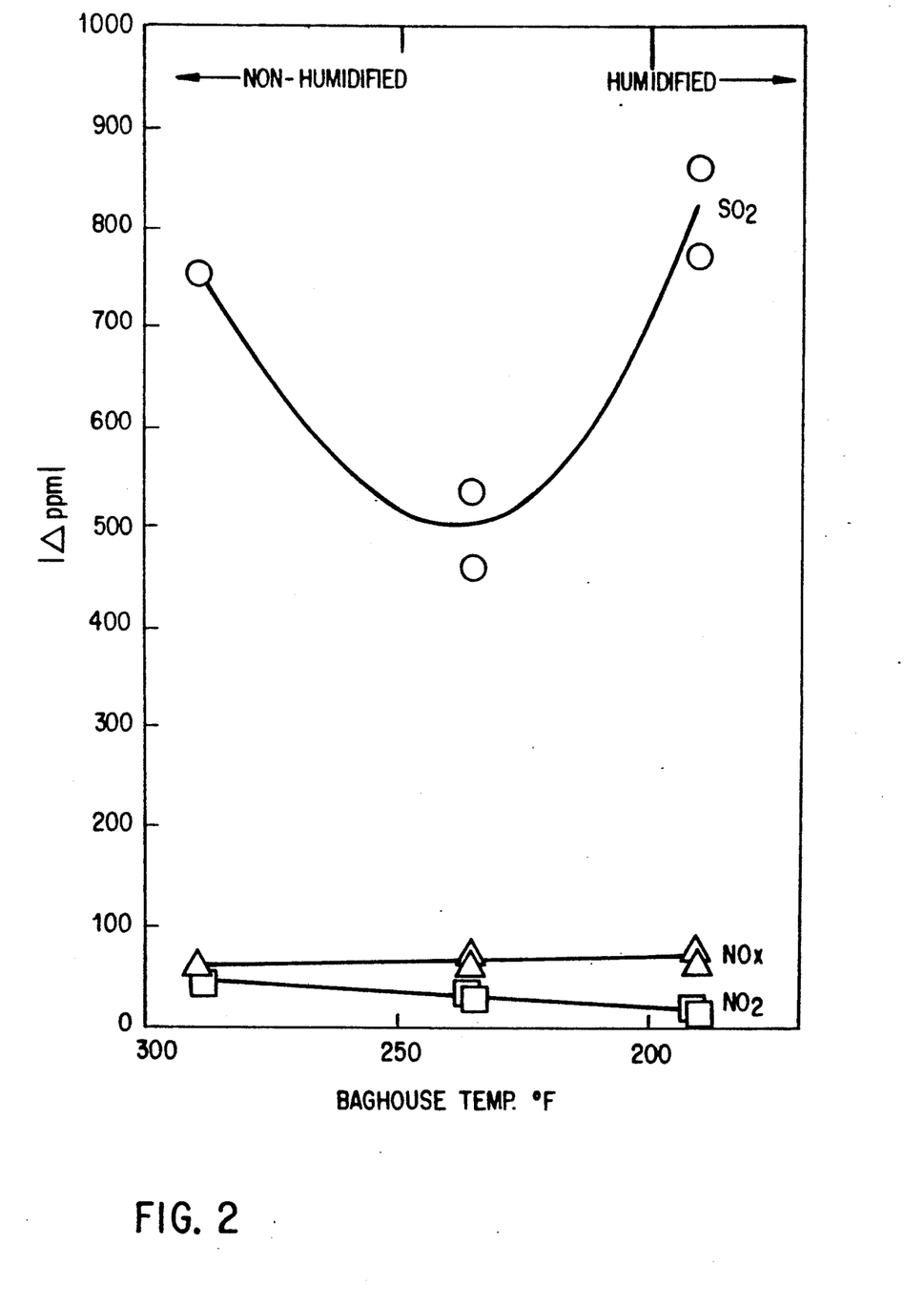
FIG. 2 is a graph that illustrates the effect of humidification prior to sodium bicarbonate injection on $SO_2$ and $NO_x$ removal and $NO_2$ emissions in accordance with the principles of the invention.

FIG. 2 graphically illustrates the effect of humidification prior to sodium bicarbonate injection on $SO_2$ and results occurred when the sodium injection temperature was about 250° F. and the flue gas was humidified and cooled to approximately 190° F. Subsequent tests were conducted to more precisely determine the effect of the flue gas moisture concentration on the $NO_x$/Sodium chemistry. These tests, discussed below, revealed that excellent results are obtained with a moisture flue gas content in the range of 10–20%, with about 15% being preferred, a sodium additive injection temperature of 240° F.–350° F., with about 250° F. being preferred, and a baghouse temperature of 180° F–280° F., with about 190° F. being preferred.

The test conditions for these humidification experiments are shown in Table 3 below. These tests were conducted at two injection temperatures of 250° F. and 350° F. corresponding to baghouse temperatures of approximately 190° F. and 260° F., respectively, using both bicarbonate (test nos. marked "B") and sesquicarbonate (test nos. marked "S"). Tests were conducted under three different moisture conditions as indicated in the % $H_2O$ column in Table 3:

(i) when burning coal at a 9% flue gas moisture level;

(ii) when burning coal and using pre-sodium injection humidification to produce either a 15% or 13.4% moisture content; and (iii) when burning natural gas to produce a 17% $H_2O$ flue gas concentration. Also as indicated in Table 3, the temperatures of the flue gas were measured at the inlet to the baghouse (T°F Inlet), in the center of the baghouse (T°F Baghouse), and at the outlet of the baghouse (T°F Baghouse). The percent of oxygen in the flue gas in the baghouse was also measured (% $O_2$ Baghouse). Table 3 also gives the baghouse inlet and baghouse outlet $SO_2$ and $NO_x$ concentrations normalized to 3% $O_2$.

Table 4 below summarizes the results of the humidification tests set forth in Table 3. Table 4 gives the percentage $SO_2$, $NO_x$, and NO reductions and the change in NO, $NO_x$, and $NO_2$ concentrations from the injection point to the baghouse exit, which have been normalized by the change in $SO_2$ for the reasons previously stated.

TABLE 4

| NORMALIZED HUMIDIFICATION TEST RESULTS | | | | | | |
|---|---|---|---|---|---|---|
| Test No. | % SO Red. | % NO Red. | % $NO_x$ Red | $\Delta$NO $\Delta SO_2$ | $\Delta NO_x$ $\Delta SO_2$ | $\Delta NO_2$ $\Delta SO_2$ |
| 1BR | 88 | 39 | 28 | 0.11 | 0.08 | 0.035 |
| 2BR | 88 | 31 | 26 | 0.09 | 0.08 | 0.0167 |
| 3B | 94 | 56 | 46 | 0.14 | 0.12 | 0.025 |
| 4B | 90 | 29 | 29 | 0.07 | 0.07 | 0.003 |
| 5B | 79 | 28 | 24 | 0.07 | 0.06 | 0.016 |
| 6B | 84 | 18 | 17 | 0.05 | 0.05 | 0.002 |
| 7B | 62 | 4 | 1 | 0.10 | 0.09 | 0.007 |
| 8B | 66 | 6 | 6 | 0.06 | 0.06 | 0.000 |
| 10S | 73 | 39 | 22 | 0.19 | 0.11 | 0.082 |
| 11S | 86 | 25 | 15 | 0.07 | 0.04 | 0.018 |
| 12S | 94 | 12 | 11 | 0.04 | 0.03 | 0.004 |
| 13S | 69 | 7 | 7 | 0.03 | 0.03 | 0.00 |
| 14B | 79 | 37 | 33 | 0.14 | 0.13 | 0.009 |

TABLE 4-continued

| NORMALIZED HUMIDIFICATION TEST RESULTS | | | | | | |
|---|---|---|---|---|---|---|
| Test No. | % SO Red. | % NO Red. | % $NO_x$ Red | $\Delta$NO $\Delta SO_2$ | $\Delta NO_x$ $\Delta SO_2$ | $\Delta NO_2$ $\Delta SO_2$ |
| 15B | 86 | 34 | 30 | 0.12 | 0.10 | 0.015 |

Figure 4:
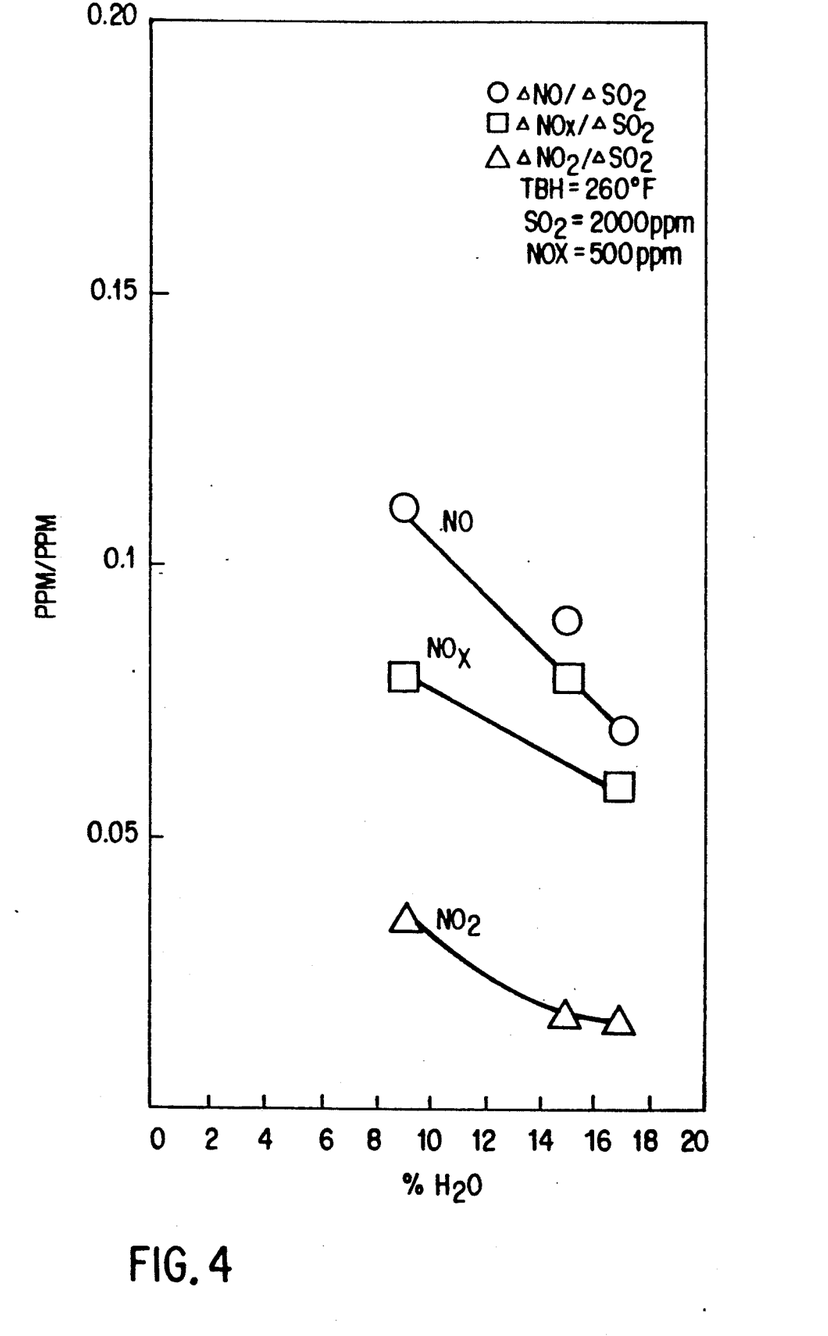
FIG. 4 is a graph that illustrates the effect of flue gas moisture content on NO and $NO_x$ removals and $NO_2$ emissions with a baghouse temperature of 260° F.
Figure 5:
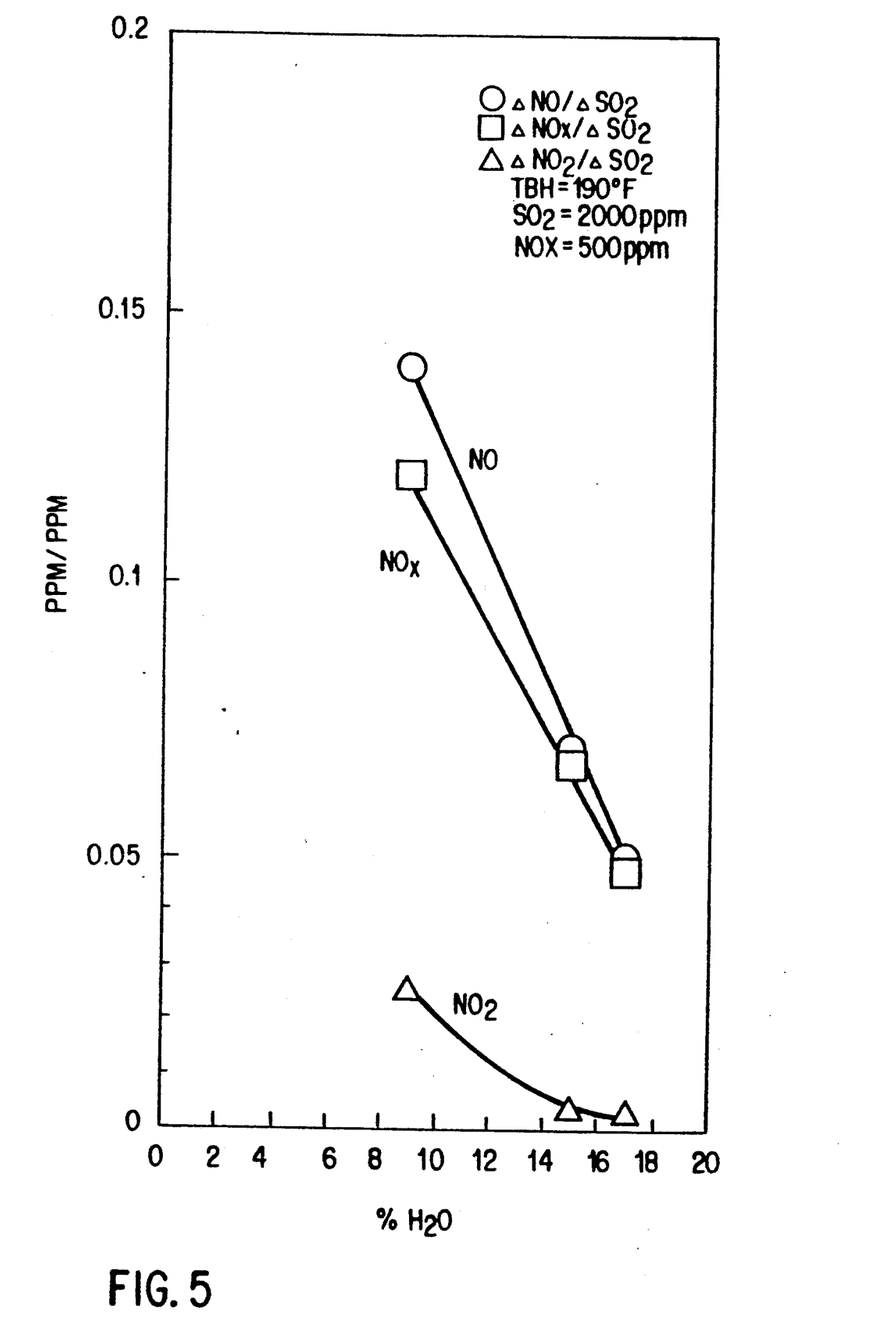
FIG. 5 is a graph that illustrates the effect of flue gas moisture content on NO and $NO_x$ removals and $NO_2$ emissions with a baghouse temperature of 190° F.

The results of the tests summarized in Tables 3 and 4 are graphically shown in FIGS. 4–10. FIGS. 4 and 5 illustrate the effect of changes in flue gas moisture content on NO and $NO_2$ removals and $NO_2$ increase (normalized by the change in $SO_2$ concentration) for 260° F. and 190° F. baghouse temperatures, respectively. The normalized change in concentration of the gas species is plotted on the vertical axes, while the moisture content of the gas is plotted on the horizontal axes. These graphs show that the conversion of NO to $NO_2$ and $NO_x$ removal are both affected by the flue gas moisture level. As shown in FIG. 5, with a 190° F. baghouse temperature and a 15% moisture concentration, the increase in $NO_2$ emissions was only 3 ppm per 1000 ppm $SO_2$ removed.

Figure 6:
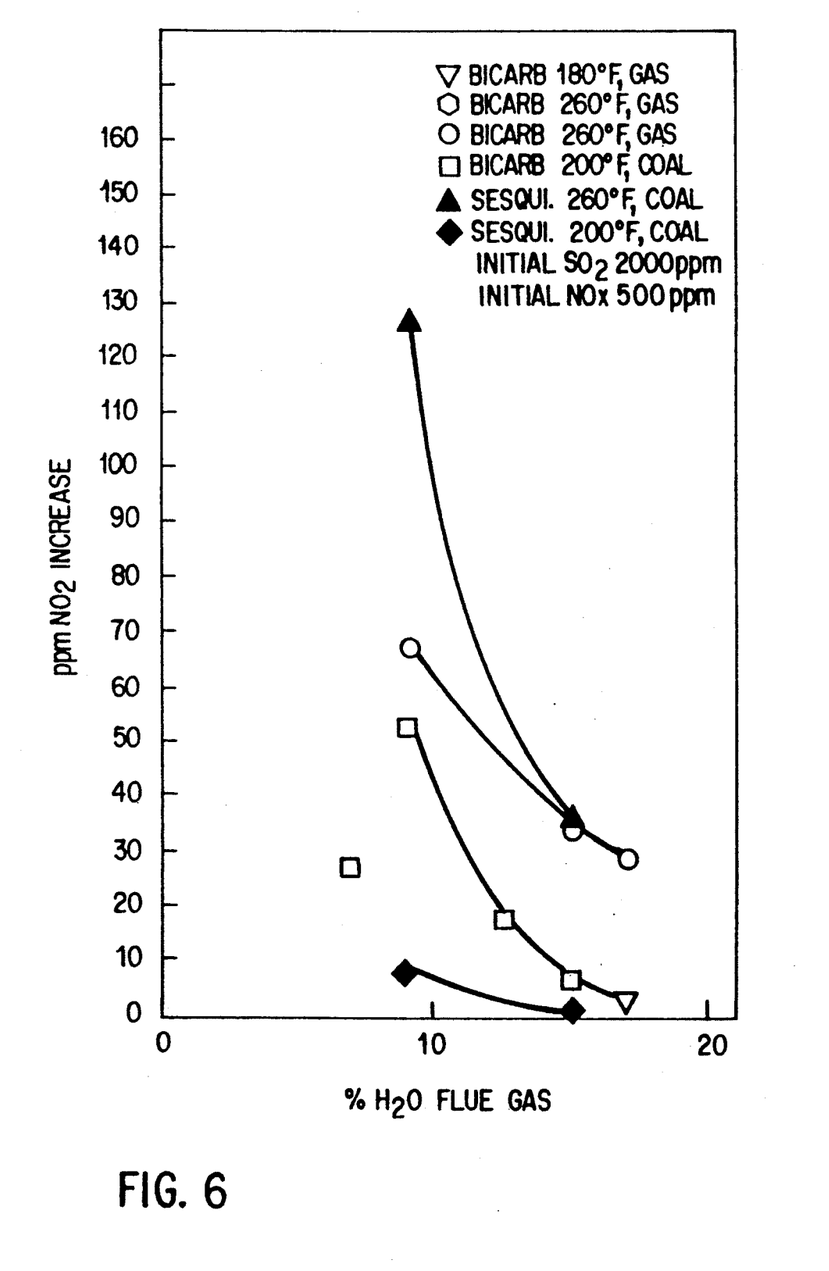
FIG. 6 is a graph that illustrates the effect of flue gas moisture on the increase in $NO_2$ emissions.

The $NO_2$ emission results for these tests are shown in FIG. 6. The amount of increase of $NO_2$ emissions in ppm is shown on the vertical axis, while the moisture content of the flue gas is shown on the horizontal axis. The tests results show a definite relationship between both the baghouse temperature and the flue gas moisture level. As shown in FIG. 6, with use of either sodium bicarbonate or sodium sesquicarbonate as the additive, less than a 10 ppm $NO_2$ increase was measured at a $\Delta NO_2/\Delta SO_2 = 1.0$ when the baghouse temperature was about 200° F. and the moisture content was 15% or greater.

Figure 7:
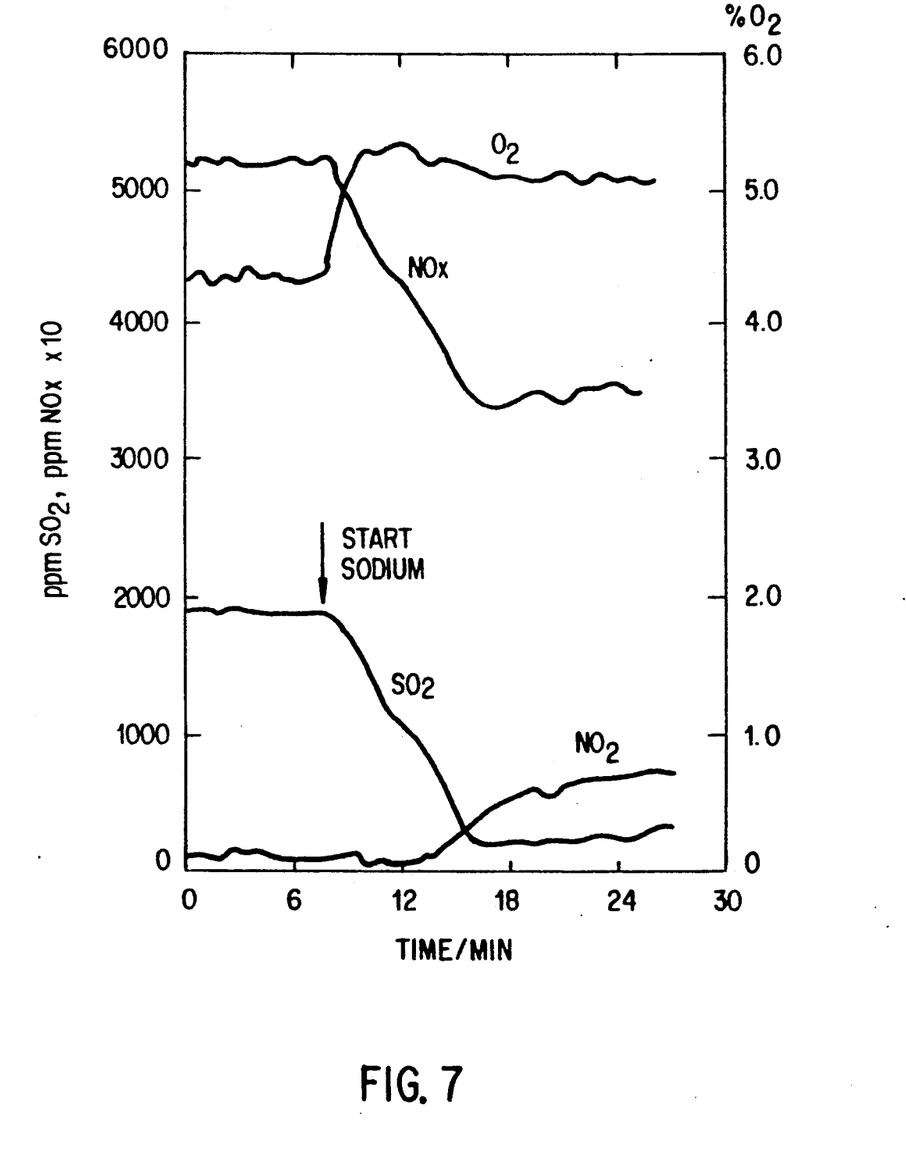
FIG. 7 is a strip chart graph showing the effect over time of bicarbonate injection with a baghouse temperature of 250° F. and a flue moisture content of 9% on $O_2$, $NO_x$, $SO_2$, and $NO_2$ levels.

FIGS. 7 through 10 show the results of the humidification tests that used bicarbonate injection as strip chart records for average baghouse temperatures of 200° F. and 250° F. and flue gas moisture levels of 9% and 15%. A strip chart record shows the change in concentration of the particular gas species over time, as the vertical and horizontal axes of these figures indicate. FIG. 7 shows the rate of removal of $SO_2$ and $NO_x$ for a baghouse temperature of 250° F. and a 9% moisture content. The $SO_2$ reached an equilibrium concentration approximately 6 minutes after the sodium injection is begun, while the $NO_2$ remained low until about 4 minutes after sodium injection began.

TABLE 3

| | | | | | | HUMIDIFICATION TEST CONDITIONS | | | | | | | |
|---|---|---|---|---|---|---|---|---|---|---|---|---|---|
| | | | | | | Inlet @ 3% $O_2$ | | | | | Outlet @ 3% $O_2$ | | |
| Test No. | % $H_2O$ | T °F. Inlet | T °F. Baghouse | % $O_2$ Baghouse | T °F. Outlet | ppm $SO_2$ | ppm NO | ppm $NO_x$ | ppm $NO_2$ | $Na_2$/S | $SO_2$ ppm (% $SO_2$ Red.) | NO ppm (% NO Red.) | $NO_x$ ppm (% NO Red.) | $NO_2$ ppm |
| 1BR | 9 | 339 | 268 | 5.0 | 243 | 2157 | 541 | 548 | 6 | 1.12 | 267(87.6) | 329(39.2) | 393(28.2) | 73 |
| 2BR | 15 | 327 | 252 | 5.4 | 226 | 2039 | 535 | 548 | 14 | 1.12 | 240(88) | 365(31) | 406(26) | 48 |
| 3B | 9 | 263 | 202 | 5.3 | 186 | 2249 | 536 | 546 | 8 | 1.13 | 146(94) | 238(56) | 292(46) | 61 |
| 4B | 15 | 258 | 195 | 4.2 | 169 | 2126 | 480 | 489 | 5 | 1.13 | 202(90) | 338(29) | 348(29) | 11 |
| 5B | 17 | 334 | 263 | 5.6 | 240 | 2273 | 440 | 440 | 0 | | 485(79) | 315(28) | 334(24) | 29 |
| 6B | 17 | 247 | 178 | 6.0 | 156 | 1686 | 456 | 456 | 4 | | 267(84) | 375(18) | 378(17) | 7 |
| 7B | 17 | 342 | 244 | 6.1 | 208 | 700 | 514 | 518 | 5 | | 269(61.6) | 473(4) | 480(1) | 8 |
| 8B | 17 | 245 | 180 | 4.5 | 159 | 667 | 485 | 488 | 8 | | 229(66) | 457(6) | 460(6) | 8 |
| 10S | 9 | 339 | 274 | 5.0 | 252 | 2103 | 762 | 768 | 3 | 1.11 | 563(73) | 461(39) | 595(22) | 129 |
| 11S | 15 | 341 | 284 | 4.5 | 262 | 2178 | 529 | 529 | 1 | 1.11 | 312(86) | 397(25) | 448(15) | 36 |
| 12S | 9 | 255 | 187 | 5.3 | 172 | 2063 | 562 | 566 | 3 | 1.12 | 108(94) | 493(12) | 504(11) | 11 |
| 13S | 15 | 243 | 180 | 7.3 | 176 | 1995 | 555 | 569 | 14 | 0.08 | 614(69) | 518(7) | 530(7) | 12 |
| 1B | 9 | 338 | 235 | 6.6 | 200 | 2203 | 580 | 581 | 1 | 0.97 | 357(84) | 398(31) | 428(26) | 30 |
| 2B | 15 | 326 | 240 | 4.5 | 207 | 2070 | 549 | 556 | 7 | 0.90 | 104(95) | 478(13) | 484(13) | 4 |
| 14B | 13.4 | 249 | 185 | 5.1 | 164 | 2081 | 640 | 643 | 3 | | 435(79.1) | 404(37) | 432(32.8) | 19 |
| 15B | 7.1 | 243 | 191 | 5.3 | 177 | 2046 | 593 | 600 | 5 | | 290(85.8) | 390(34) | 418(30) | 32 |

Figure 8:
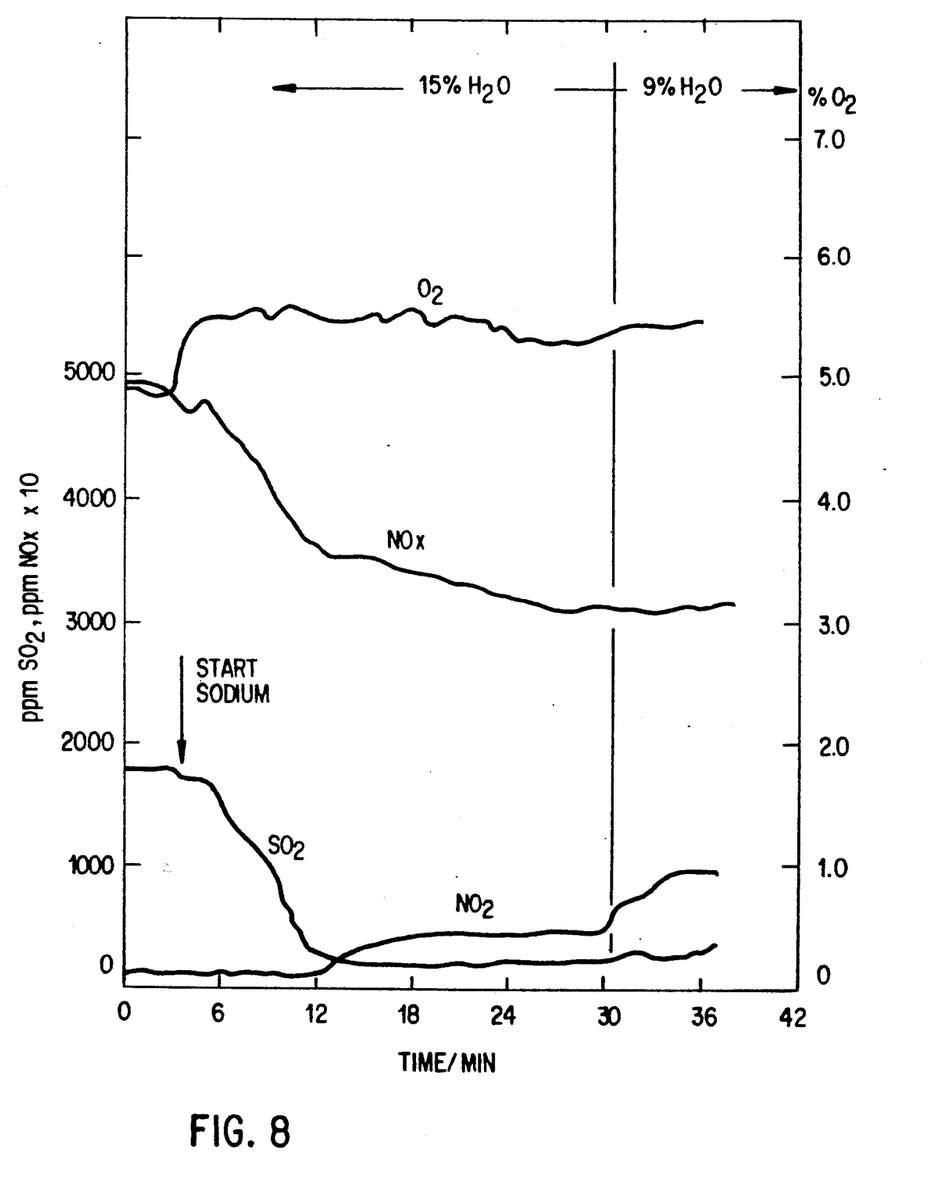
FIG. 8 is a strip chart graph showing the effect over time of bicarbonate injection with a baghouse temperature of 250° F. and a flue moisture content of 15% on $O_2$, $NO_x$, $SO_2$, and $NO_2$ levels.

FIG. 8 shows the results for a baghouse temperature of 250° F. and a H$_2$O content of 15%. At t=30 min, the additional humidification step was stopped thereby reducing the moisture content to the original 9% and providing a rapid rise in NO$_2$ emissions. Thus, the effect of the additional humidification step appears to be to maintain the NO$_2$ concentration lower for a longer time after bicarbonate injection and to reduce the amount of NO$_2$ formed.

Figure 9:
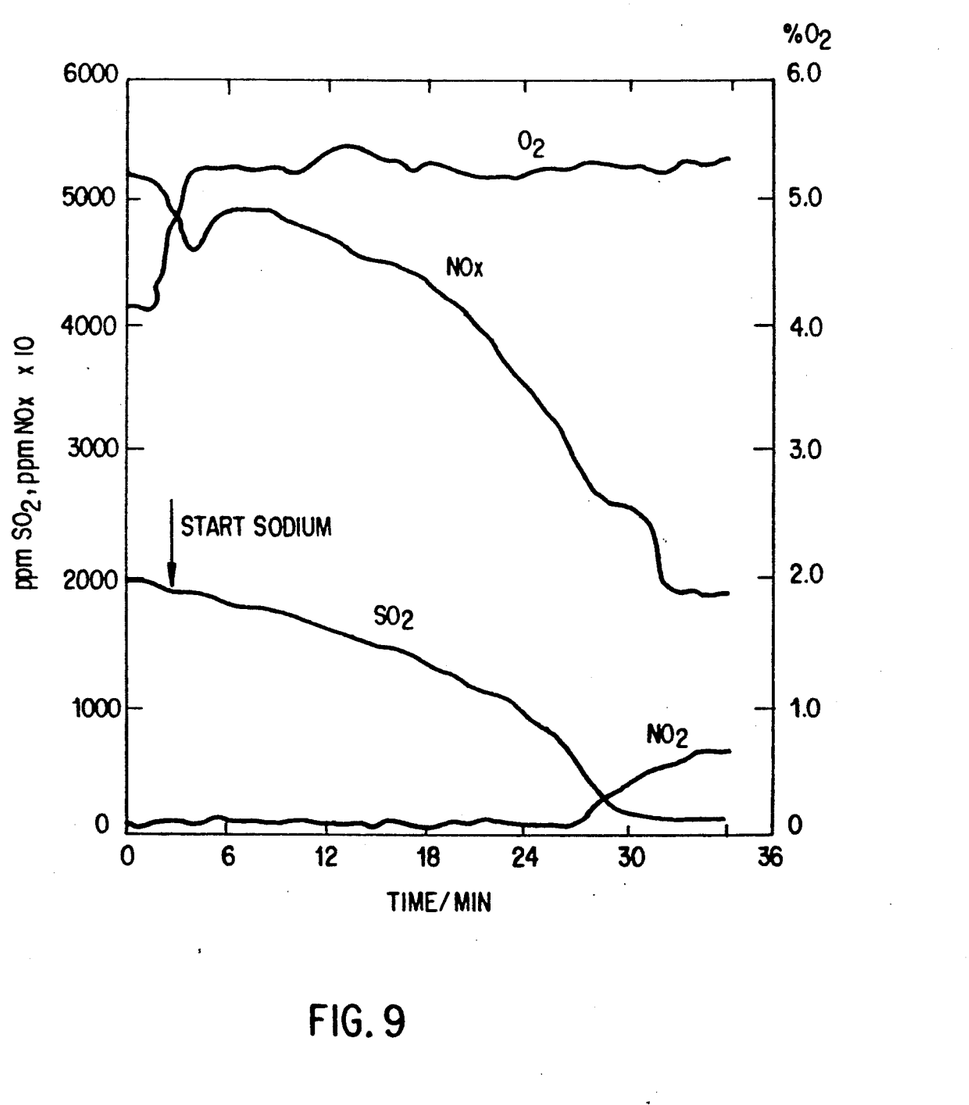
FIG. 9 is a strip chart graph showing the effect over time of bicarbonate injection with a baghouse temperature of 200° F. and a flue moisture content of 9% on $O_2$, $NO_x$, $SO_2$, and $NO_2$ levels.
Figure 10:
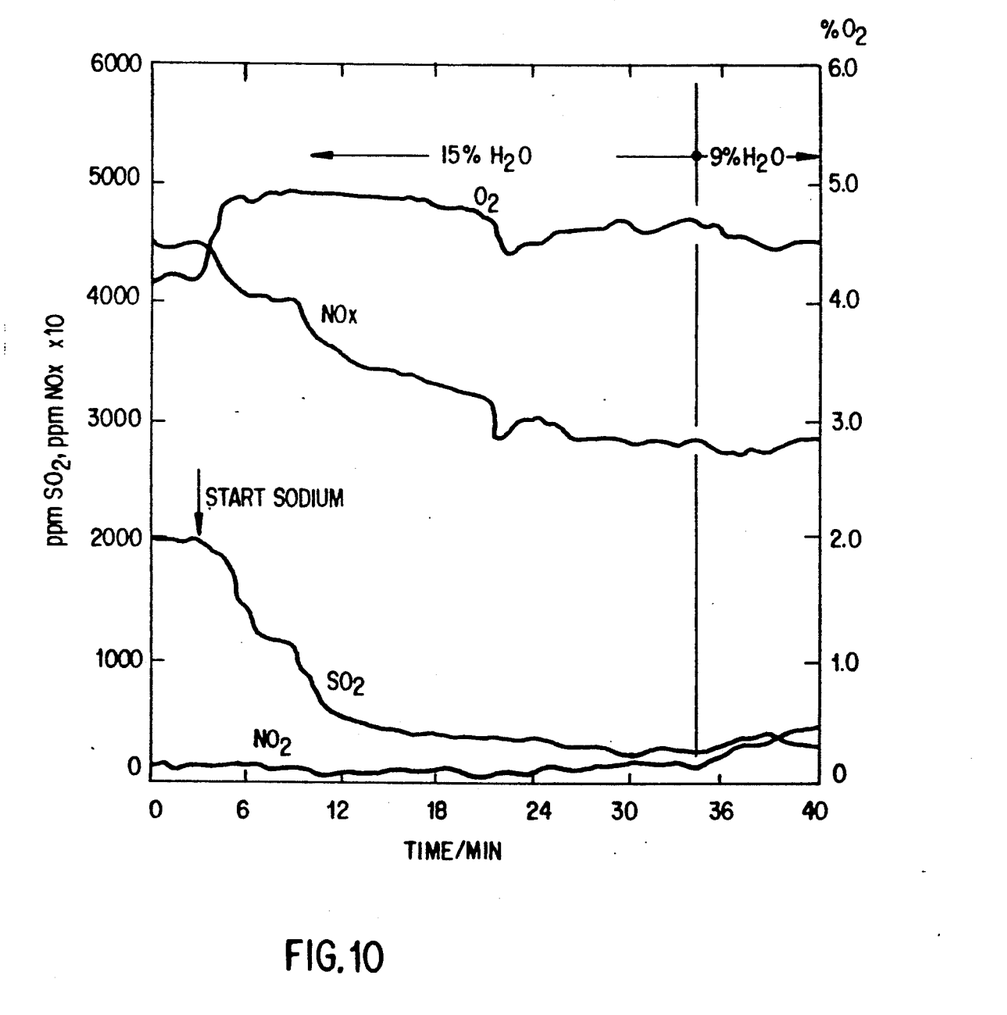
FIG. 10 is a strip chart graph showing the effect over time of bicarbonate injection with a baghouse temperature of 200° F. and a flue moisture content of 15% on $O_2$, $NO_x$, $SO_2$, and $NO_2$ levels.

FIGS. 9 and 10 show similar results to those depicted in FIGS. 7 and 8 but for a 200° F. baghouse temperature and moisture contents of 9% and 15%, respectively. As evident from these figures, the effect of H$_2$O addition is similar to that found at the higher temperature.

What is claimed is:

1. A method of reducing nitrogen dioxide (NO$_2$) emissions in a dry sodium scrubbing process without significantly reducing sulfur dioxide (SO$_2$) and nitrogen oxides (NO$_x$) removal efficiencies, said method consisting essentially of:
   (a) injecting a dry sodium carbonate source into a flue gas duct carrying flue gas from a solid fossil fuel-burning combustor to a dry particulate collection device to remove sulfur dioxide and nitrogen oxides from the flue gas; and
   (b) humidifying the flue gas by separately introducing water into the flue gas duct at a point upstream of the particulate collection device to increase the moisture content of the flue gas to at least about 10% H$_2$O but less than an amount that would saturate the flue gas with H$_2$O, thereby producing an NO$_2$ concentration downstream of the particulate collection device below the level at which a brown plume becomes visible upon venting of the flue gas to atmosphere, said downstream NO$_2$ concentration being less than that obtained when the water is not introduced.

2. The method of claim 1 wherein the flue gas is humidified by introducing water into the flue gas duct at a point upstream of the sodium carbonate source injection point.

3. The method of claim 1 wherein the flue gas is humidified to increase the moisture content of the flue gas to a value in the range of 10-20% H$_2$O.

4. The method of claim 3 wherein the sodium carbonate source is injected at a temperature of approximately 240° F.-350° F. and the temperature of the flue gas in the particular collection device is approximately 180° F.-280° F., but lower than that prior to water introduction.

5. The method of claim 4 wherein the sodium carbonate source is injected at a temperature of approximately 250° F. and the humidification step increases the moisture content of the flue gas to approximately 15% H$_2$O and reduces the temperature of the flue gas in the particulate collection device to approximately 190° F.

6. The method of claim 2 wherein the flue gas duct includes a heat exchanger disposed between the combustor and the particulate collection device and the sodium carbonate source is injected into the duct at a point downstream of the heat exchanger.

7. The method of claim 6 wherein the flue gas is humidified by introducing water into the duct at a point disposed between the heat exchanger and the sodium carbonate source injection point.

8. The method of claim 6 wherein the flue gas is humidified by introducing water into the duct at a point disposed upstream of the heat exchanger.

9. The method of claim 6 wherein the temperature of the flue gas at a point immediately downstream of the heat exchanger is approximately 350° F., the sodium carbonate source is injected at a temperature of 240° F.-350° F., and a sufficient amount of water is introduced into the flue duct to humidify the gas to a moisture content of 10-20% and to reduce the temperature of the flue gas in the particular collection device to 180° F.-280° F., but lower than that prior to water introduction.

10. The method of claim 9 wherein the sodium carbonate source is injected into the flue gas at a temperature of approximately 250° F., the moisture content of the flue gas after humidification is approximately 15%, and the temperature of the flue gas in the baghouse is approximately 190° F.

11. The method of claim 1 wherein the sodium carbonate source comprises at least one compound selected from the group consisting of sodium bicarbonate and sodium sesquicarbonate.

12. The method of claim 1 where the particular collection device is a baghouse.

13. A method of reducing nitrogen dioxide (NO$_2$) emissions in a dry sodium scrubbing process without significantly reducing sulfur dioxide (SO$_2$) and nitrogen oxides (NO$_x$) removal efficiencies, said method consisting essentially of:
   (a) injecting a dry sodium carbonate source into a flue gas duct carrying flue gas from a solid fossil fuel-burning combustor to a dry particulate collection device to remove sulfur dioxide and nitrogen oxides from the flue gas;
   (b) separately injecting a sulfur adsorbing sorbent into the flue gas at a point upstream of the sodium injection to remove sulfur dioxide from the flue gas; and
   (c) humidifying the flue gas by separately introducing water into the flue gas at a point upstream of the particulate collection device to increase the moisture content of the flue gas to at least about 10% H$_2$O but less than an amount that would saturate the flue gas with H$_2$O, thereby producing an NO$_2$ concentration downstream of the particulate collection device below the level at which a brown plume becomes visible upon venting of the flue gas to atmosphere, said downstream NO$_2$ concentration being less than that obtained when the water is not introduced.

14. The method of claim 13 wherein convective banks are provided in a convection section disposed between the combustor and the flue gas duct for receiving gases from the combustor and extracting heat therefrom, and the sulfur adsorbing sorbent is injected into the convection section.

15. The method of claim 13 wherein the flue gas is humidified by separately introducing water into the flue gas at a point downstream of the sulfur adsorbing sorbent injection point and upstream of the sodium additive injection point.

16. The method of claim 13 wherein the flue gas is humidified to increase the moisture content of the flue gas to a value in the range of 10-20% H$_2$O.

17. The method of claim 13 wherein the step of separately injecting a sulfur adsorbing sorbent comprises injecting a sorbent selected from the group consisting of limestone and similar calcium-based materials.

* * * * *